(12) United States Patent
Kita

(10) Patent No.: US 12,231,301 B2
(45) Date of Patent: Feb. 18, 2025

(54) CAUSE INFERENCE REGARDING NETWORK TROUBLE

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/043,041

(22) PCT Filed: May 30, 2022

(86) PCT No.: PCT/JP2022/021958
§ 371 (c)(1),
(2) Date: Feb. 27, 2023

(87) PCT Pub. No.: WO2023/233470
PCT Pub. Date: Dec. 7, 2023

(65) Prior Publication Data
US 2024/0283707 A1 Aug. 22, 2024

(51) Int. Cl.
*H04L 41/16* (2022.01)
*H04L 41/0631* (2022.01)
*H04L 41/40* (2022.01)

(52) U.S. Cl.
CPC ............ *H04L 41/16* (2013.01); *H04L 41/064* (2013.01); *H04L 41/40* (2022.05)

(58) Field of Classification Search
CPC ........ H04L 41/16; H04L 41/40; H04L 41/064
USPC ....................................................... 709/224
See application file for complete search history.

(56) References Cited

U.S. PATENT DOCUMENTS

| | | | |
|---|---|---|---|
| 11,616,707 B2 * | 3/2023 | Padfield | H04L 43/0823 709/224 |
| 11,627,033 B2 * | 4/2023 | Umakanth | H04L 43/0823 709/224 |
| 2021/0232291 A1 * | 7/2021 | Abdulaal | G06F 11/3065 |
| 2022/0029902 A1 * | 1/2022 | Shemer | H04L 41/0686 |
| 2022/0174511 A1 * | 6/2022 | Kvernvik | H04W 24/08 |
| 2022/0358375 A1 | 11/2022 | Finnie et al. | |

(Continued)

FOREIGN PATENT DOCUMENTS

| | | |
|---|---|---|
| EP | 3684010 A1 | 7/2020 |
| JP | 2020536434 A | 12/2020 |

*Primary Examiner* — Wing F Chan
*Assistant Examiner* — Leon Y Tseng
(74) *Attorney, Agent, or Firm* — HAUPTMAN HAM, LLP

(57) ABSTRACT

To appropriately determine a trouble occurring in a network. A network system acquires an output obtained when input data including an index acquired from a target network is input to a cause inference model. The cause inference model is one of a plurality of cause inference models. The plurality of cause inference models respectively correspond to a plurality of groups into which a plurality of networks have been classified and are trained based on training data including input data including an index acquired for each corresponding group and ground truth data indicating a cause of a trouble. The input cause inference model corresponds to a group to which the target network of the plurality of networks belongs. The network system executes a process for responding to a trouble that has occurred in the target network based on the output of the trouble cause inference model for the target network.

8 Claims, 13 Drawing Sheets

(56) References Cited

U.S. PATENT DOCUMENTS

| | | | |
|---|---|---|---|
| 2023/0188409 A1* | 6/2023 | Wang | G05B 23/0281 709/224 |
| 2023/0246901 A1* | 8/2023 | Trivedi | H04L 41/0695 709/224 |

* cited by examiner

FIG.5

| SLICE ID | TYPE | CONFIGURATION | GROUP |
|---|---|---|---|
| NS1 | | AMFx1,SMFx1,UPFx1,TOHOKU REGION | G1 |
| NS2 | | AMFx1,SMFx1,UPFx1,KYUSHU REGION | G1 |
| NS3 | | AMFx3,SMFx2,UPFx3,KANTO REGION | G2 |
| NS4 | | AMFx2,SMFx2,UPFx3,KANSAI REGION | G2 |
| NS5 | IoT | AMFx2,SMFx2,UPFx1,WHOLE COUNTRY | G3 |

FIG.9

| API TYPE | GROUP | CAUSE INFERENCE MODEL ID |
|---|---|---|
| API_A | G1 | mA1 |
| API_A | G2 | mA2 |
| API_A | G3 | mA3 |
| API_B | G1 | mB1 |
| API_B | G2 | mB1 |
| API_B | G3 | mB2 |

CAUSE INFERENCE REGARDING NETWORK TROUBLE

RELATED APPLICATIONS

The present application is a National Phase of International Application Number PCT/JP2022/021958, filed May 30, 2021.

TECHNICAL FIELD

The present disclosure relates to a network system and a method of responding to a network trouble.

BACKGROUND ART

In recent years, a communication network is provided by dividing the communication network into a plurality of networks (for example, a plurality of network slices) based on a type of a target terminal or a region, for example. In the plurality of networks, the configuration and usage status thereof are different from each other depending on individual conditions.

CITATION LIST

Patent Literature

[Patent Literature 1] JP 2020-536434 A

SUMMARY OF INVENTION

Technical Problem

In order to efficiently monitor those networks, it is conceivable to analyze troubles that have occurred in the networks by using a machine learning model.

Meanwhile, each network has a different background, for example, a different configuration and usage status. While troubles occur in the networks depending on the individual backgrounds, it is not easy to train a machine learning model for each network.

The present disclosure has been made in view of the above-mentioned circumstances, and has an object to provide a technology capable of appropriately determining a trouble occurring in a network by using a small number of machine learning models.

Solution to Problem

In order to solve the above-mentioned problems, according to one embodiment of the present disclosure, there is provided a network system including one or more processors. The network system is configured to cause at least one of the one or more processors to execute a cause inference process and a response process. In the cause inference process, an output obtained when input data including an index acquired from a target network of a plurality of networks is input to a cause inference model is acquired. The input cause inference model is one of a plurality of cause inference models which respectively correspond to a plurality of groups into which a plurality of networks have been classified and are respectively trained based on training data including input data including an index acquired for each corresponding group and ground truth data indicating a cause of a trouble. The input cause inference model corresponds to a group to which the target network of the plurality of networks belongs. In the response process, a process for responding to a trouble that has occurred in the target network is executed based on the output of the cause inference model for the target network.

Further, according to one embodiment of the present disclosure, there is provided a method of responding to a network trouble, the method including one or more processors and causing at least one of the one or more processors to execute a cause inference process and a response process. In the cause inference process, an output obtained when input data including an index acquired from a target network of a plurality of networks is input to a cause inference model is acquired. The input cause inference model is one of a plurality of cause inference models which respectively correspond to a plurality of groups into which a plurality of networks have been classified and are respectively trained based on training data including input data including an index acquired for each corresponding group and ground truth data indicating a cause of a trouble. The input cause inference model corresponds to a group to which the target network of the plurality of networks belongs. In the response process, a process for responding to a trouble that has occurred in the target network is executed based on the output of the cause inference model for the target network.

BRIEF DESCRIPTION OF DRAWINGS

FIG. 5 is a table for showing an example of attributes of network slices.

FIG. 9 is a table for showing an example of correspondence among cause inference models, APIs, and groups.

DESCRIPTION OF EMBODIMENTS

An embodiment of the present disclosure is now described in detail with reference to the drawings.

Figure 1:
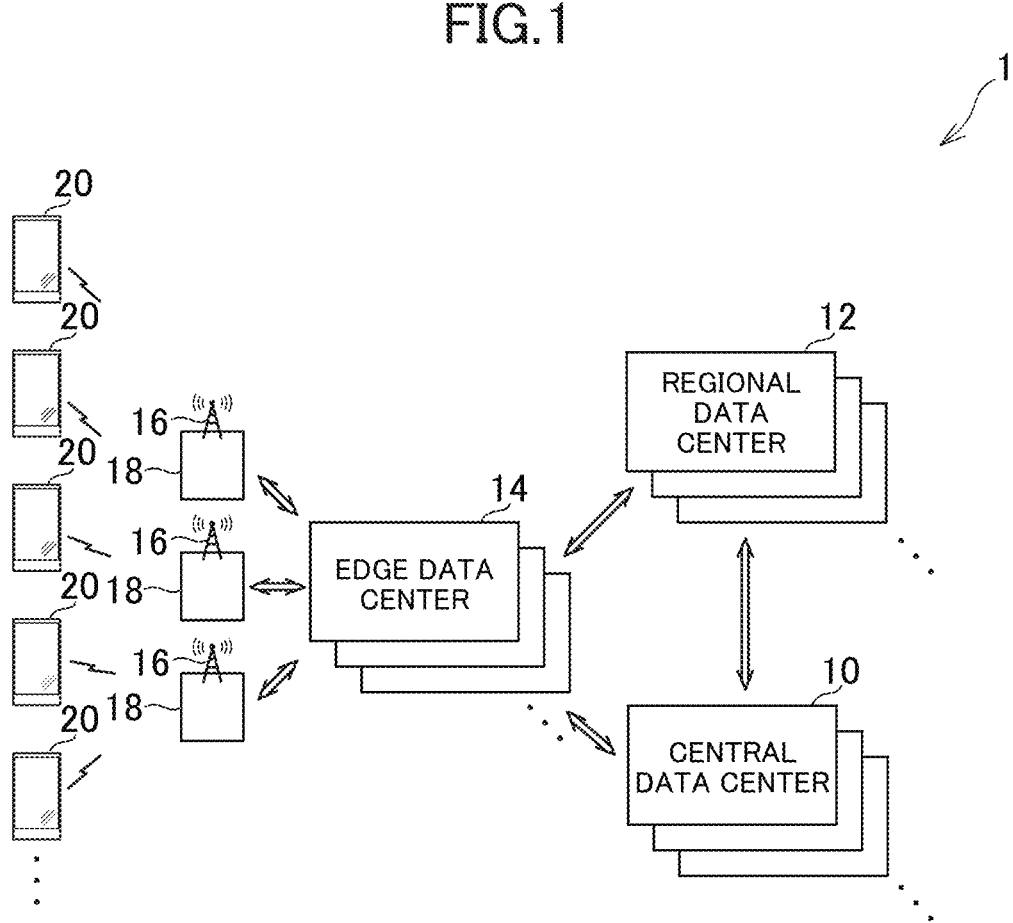
FIG. 1 is a diagram for illustrating an example of a communication system in an embodiment of the present disclosure.
Figure 2:
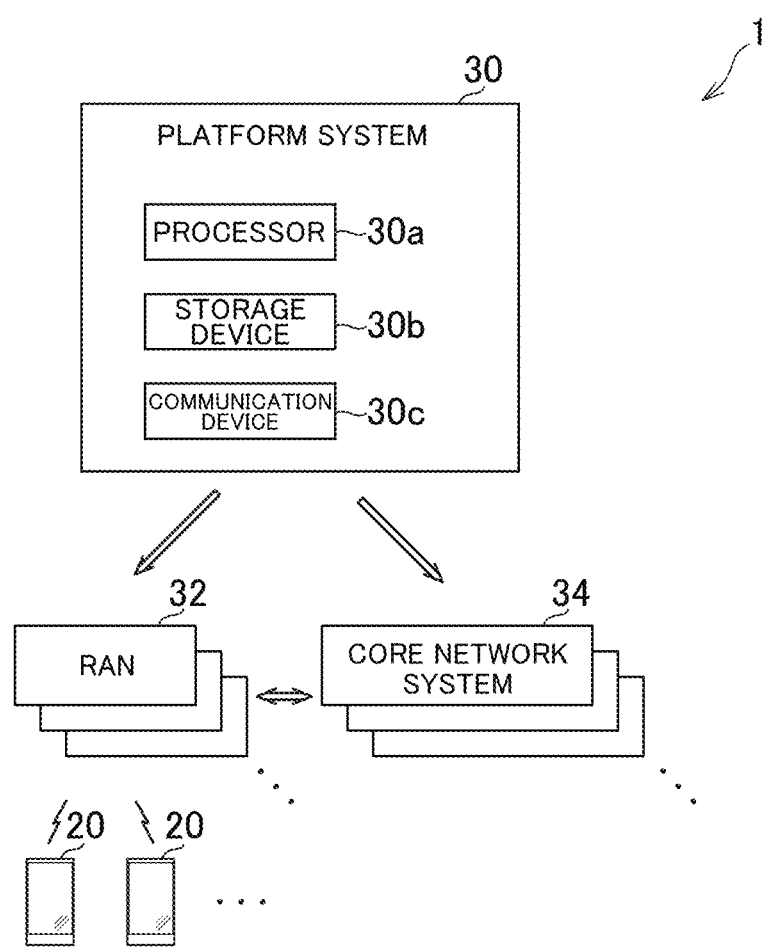
FIG. 2 is a diagram for illustrating an example of the communication system in the embodiment.

FIG. 1 and FIG. 2 are each a diagram for illustrating an example of a communication system 1 in the embodiment of the present disclosure. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to/from a communication facility 18 including an antenna 16. As illustrated in FIG. 1, one edge data center 14 may be capable of communicating to/from several communication facilities 18. The communication facility 18 may include a computer such as a server computer. The communication facility 18 in this embodiment performs radio communication to/from a user equipment (UE) 20 via the antenna 16. The communication facility 18 including the antenna 16 is provided with, for example, a radio unit (RU) described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to/from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which includes the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes one or more processors 30$a$, a storage device 30$b$, and a communication device 30$c$, as illustrated in FIG. 2. The processor 30$a$ is a program control device such as a microprocessor which operates in accordance with a program installed in the platform system 30. The storage device 30$b$ is, for example, a storage element, such as a ROM or RAM, a solid state drive (SSD), a hard disk drive (HDD), or the like. The storage device 30$b$ stores a program to be executed by the processor 30$a$, and the like. The communication device 30$c$ is, for example, a communication interface, such as a network interface controller (NIC) or a wireless local area network (LAN) module. The communication device 30$c$ exchanges data with the RAN 32 and the core network system 34. The communication device 30$c$ may form a part of software-defined networking (SDN).

In this embodiment, the platform system 30 is implemented by a server group arranged in the central data center 10. The platform system 30 may be implemented by a server group arranged in the regional data center 12. The processor 30$a$, the storage device 30$b$, and the communication device 30$c$ may actually be included in a server. The RAN 32 and the core network system 34 may include a processor 30$a$, a storage device 30$b$, and a communication device 30$c$ in the same way as the platform system 30.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service, such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to/from other users via the RAN 32 and the core network system 34. The UE 20 of the end user can also access a data network, such as the Internet via the RAN 32 and the core network system 34.

In addition, in this embodiment, an internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service in this embodiment is formed of one or more functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or more CNFs. The functional unit in this embodiment may also correspond to a network node.

Figure 3:
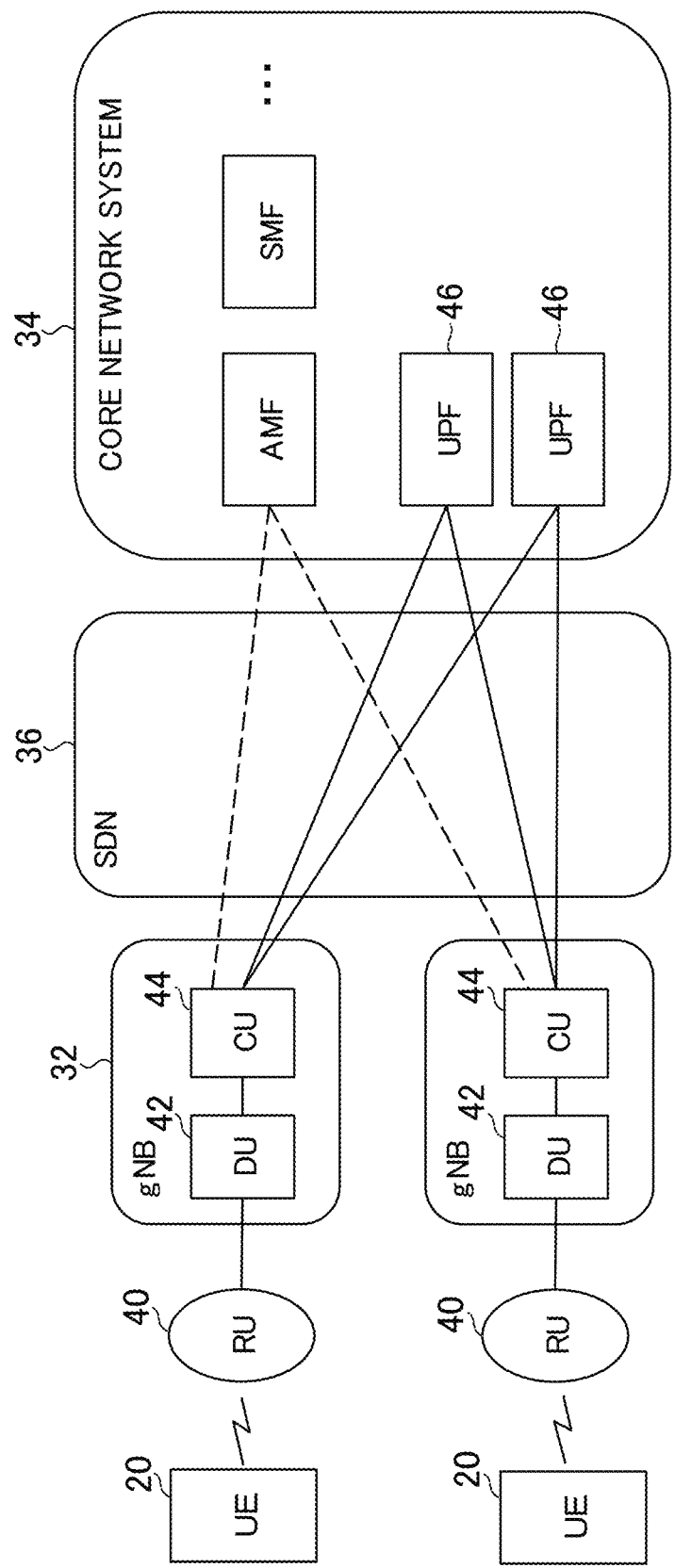
FIG. 3 is a diagram for schematically illustrating an example of a network service in the embodiment.

FIG. 3 is a diagram for schematically illustrating an example of an operating network service. In FIG. 3, an example of a configuration relating to an end-to-end network slice of one of the network services is illustrated. A network slice is a virtual division of a physical communication network.

The network service illustrated in FIG. 3 includes NFs, such as a plurality of RUs 40, a plurality of DUs 42, a plurality of CUs 44, a plurality of user plane functions (UPEs) 46, one or more access and mobility management functions (AMFs), and one or more session management functions (SMFs), as software elements.

A network route is arranged between the CU 44 and each AMF and UPE by an SDN 36. The SDN 36 is implemented by a dedicated network device and a device including a plurality of servers. The network route corresponds to a type of tunnel. In the SDN 36, based on the software settings, it is possible to set a new route or change the devices through which an existing route passes physically.

In this embodiment, for example, the network service illustrated in FIG. 3 provides a communication service in a certain area. The network service also includes other software elements, but description of those elements is omitted. In addition, the network service is implemented on a plurality of servers or other computer resources (hardware elements).

Figure 4:
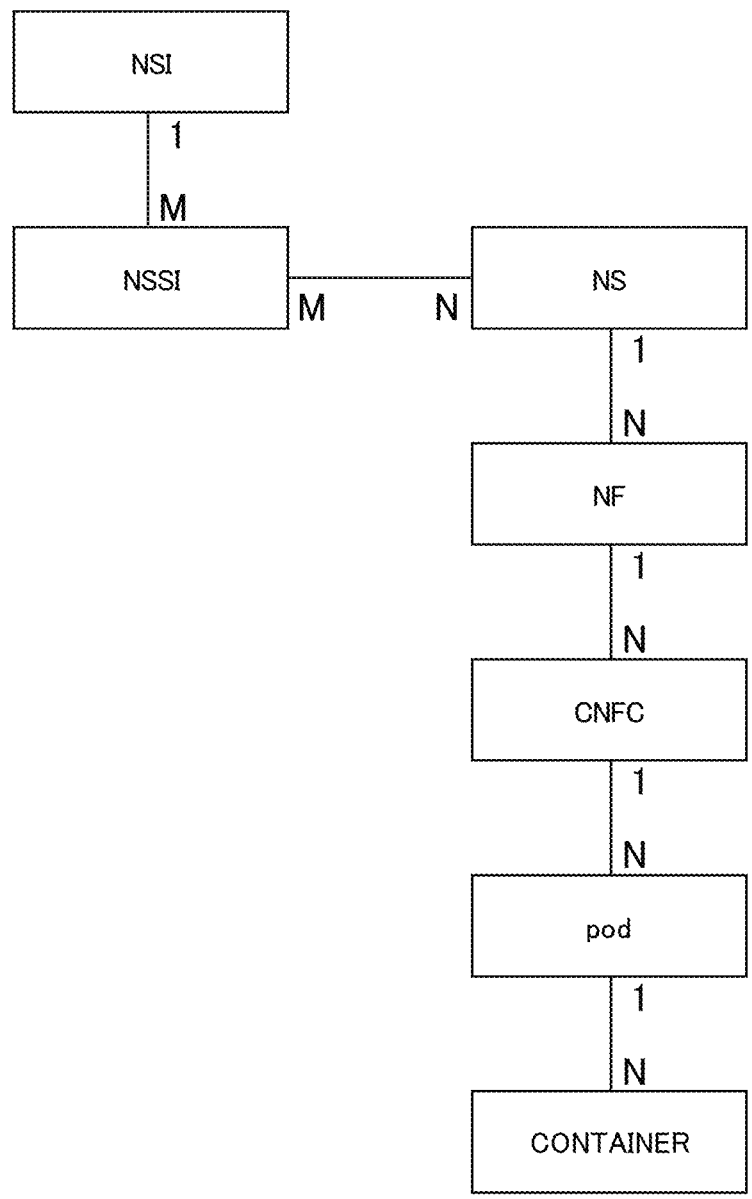
FIG. 4 is a diagram for illustrating an example of links between elements constructed in the communication system in the embodiment.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU 42, the CU 44, or the UPF 46. The NF also corresponds to an element having a granularity, such as an AME or an SMF. In 4G, the NF corresponds to an element having a granularity, such as a mobility management entity (MME), a home subscriber server (HSS), a serving gateway (S-GW), a vDU, or a vCU. In this embodiment, for example, one NS includes one or more NFs. That is, one or more NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU 42, the CU 44, and the like. Some CNFCs may be microservices that provide a part of the functions of the UPF 46, the AME, the SMF, and the like. In this embodiment, for example, one NF includes one or more CNFCs. That is, one or more CNFCs belong to one NF.

The pod refers to, for example, the minimum unit for managing a Docker container by Kubernetes. In this embodiment, for example, one CNFC includes one or more pods. That is, one or more pods belong to one CNFC.

In this embodiment, for example, one pod includes one or more containers. That is, one or more containers belong to one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or more NSSIs. That is, one or more NSSIs belong to one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or more network slices. Specifically, for example, network slice selection assistance information (NSSAI) including one or more pieces of sub-network slice selection assist information (S-NSSAI) can be set for one NF. In this case, the S-NSSAI is information associated with the network slice. The NF is not required to belong to the network slice.

The plurality of network slices may differ from each other in terms of, for example, a target area, configuration of the NFs, and the type of the target UE 20. FIG. 5 is a table for showing an example of attributes of network slices. In FIG. 5, a slice ID, a type, a configuration, and a group are shown as the attributes of the network slices. The slice ID is information for identifying the network slice. The type indicates the type of a characteristic of the network. When the type is blank, this indicates that the network has a characteristic for communication to and from a general UE 20. When the type is IoT, this indicates that the network has a characteristic specialized for communication to and from an IoT terminal. The configuration indicates the number of NFs (AMFs, SMFs, UPFs) implementing the network slice, and the area to be covered. The group indicates the group to which the network slice belongs.

In this embodiment, the plurality of network slices are classified into a plurality of groups in accordance with the type, configuration, and a network usage characteristic (for example, urban-centered usage characteristic or suburban-centered usage characteristic) of the network slice. To classify the groups, the number of network routes determined from the numbers of AMFs, SMEs, and UPEs and the number of RANs, the types of those network routes, or the number of RANs (for example, gNBs) may also be used. The classification may be performed based on so-called clustering technology. One or more network slices belong to each of the plurality of groups.

The platform system 30 in this embodiment monitors each of the plurality of network slices, detects troubles that have occurred in those network slices, and executes a response process corresponding to the detected trouble. The process is now described in more detail.

Figure 6:
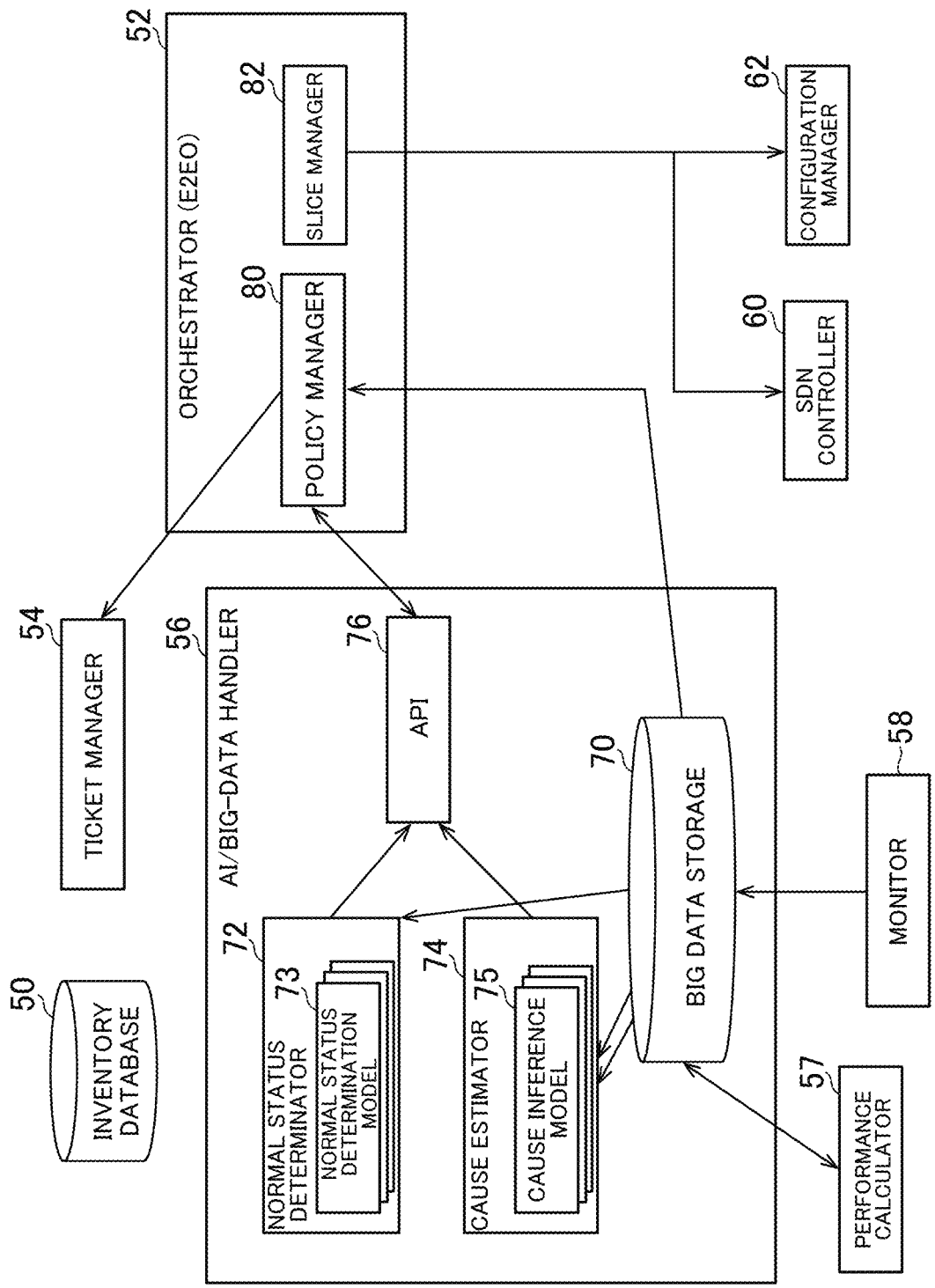
FIG. 6 is a functional block diagram for illustrating an example of functions implemented by a platform system.

FIG. 6 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 6.

As illustrated in FIG. 6, the platform system 30 in this embodiment functionally includes, for example, an inventory database 50, an orchestrator (end-to-end-orchestrator (E2EO)) 52, a ticket manager 54, an AI/big-data handler 56, a performance calculator 57, a monitor 58, an SDN controller 60, and a configuration manager 62. The E2EO 52 functionally includes a policy manager 80 and a slice manager 82. The AI/big data handler 56 functionally includes a big data storage 70, a normal status determinator 72, a cause estimator 74, and an API 76. The normal status determinator 72 includes a plurality of normal status determination models 73, and the cause estimator 74 includes a plurality of cause inference models 75. Those elements are implemented mainly by the processor 30a, the storage device 30b, and the communication device 30c.

The functions and processes described in this embodiment are implemented by causing one or more information processing devices (for example, servers) including, for example, a processor 30a and a storage device 30b (for example, a memory) to read a storage medium in which software (execution commands of programs) is recorded, and the processor 30a executing the process relating to the software. The storage medium may be, for example, a computer-readable and non-volatile information storage medium such as an optical disc, a magnetic disk, a magnetic tape, a magneto-optical disc, a flash memory, or the like. Further, the software may be stored in an external storage device (for example, a hard disk drive or a solid-state drive) included in the storage device 30b of the platform system 30. The functions illustrated in FIG. 6 may also be implemented by a circuit block, a memory, and other integrated circuits. Further, a person skilled in the art would easily understand that the functions illustrated in FIG. 6 can be implemented in various forms by only hardware, by only software, or by a combination of hardware and software.

The inventory database 50 is a database in which inventory information is stored. The inventory information includes, for example, information on a server arranged in the RAN 32 or the core network system 34 and managed by the platform system 30.

Further, in this embodiment, the inventory database 50 stores inventory data. The inventory data shows the configuration of the element groups included in the communication system 1 and the current state of links (for example, topology data) between the elements. The elements include hardware elements and software elements. Examples of the hardware elements include servers, racks, buildings, and network devices. Examples of the software elements include network slices, NFs, and operating containers. Further, the inventory data shows the status of the resources managed by the platform system 30 (for example, resource usage status).

The topology data indicating the current state of the links between the elements includes, for example, an identifier of a certain NS and an identifier of one or more NFs belonging to the certain NS, and, for example, an identifier of a certain network slice and an identifier of one or more NFs belonging to the certain network slice.

Each function of the E2EO 52, the ticket manager 54, the AI/big data handler 56, the performance calculator 57, the monitor 58, the SDN controller 60, and the configuration manager 62 illustrated in FIG. 6 refers to the inventory data stored in the inventory database 50 in the process and adds or updates the inventory data as required. For example, the inventory data stored in the inventory database 50 is updated in accordance with execution of an action such as construction of a new element included in the communication system 1, a change of a configuration of the elements included in the communication system 1, scaling of the elements included in the communication system 1, or replacement of the elements included in the communication system 1.

In this embodiment, the slice manager 82 executes instantiation of a network slice by, for example, executing the logic indicated by the slice template. The slice manager 82 may output a configuration management instruction relating to the instantiation of the network slice to the configuration manager 62. Further, the configuration manager 62 may execute configuration management, for example, performing a setting, in accordance with the configuration management instruction.

The slice manager 82 may output, to the SDN controller 60, an instruction to create a communication route between NFs (between a CU 44 and a UPF 46 and AMF). The SDN controller 60 may output, to the SDN 36, an instruction to create a more specific communication route. The instruction to create a specific communication route includes two SRV6 IP addresses as information for identifying the CU 44 and the UPF 46 or AMF communicating to and from each other.

The slice manager 82 executes a process for strengthening, in accordance with the instruction from the policy manager 80, at least one of a communication route in the network slice and an NF in the core network system 34, for example. For example, the slice manager 82 may output, to the configuration manager 62, a configuration management instruction to scale out any one of a UPF 46, an AMF, and an SMF linked to the network slice, and output a creation instruction to create a new communication route between the scaled-out UPF 46 or AMF and the CU 44 of each RAN 32 to the SDN controller 60. Further, the slice manager 82 may output, to the SDN controller 60, a change instruction to change an upper limit of the bandwidth of the communication route between the existing UPF 46 or AMF and the CU 44 of each RAN 32, or to recreate the communication route (in other words, change the communication route to be used).

The slice manager 82 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

In this embodiment, for example, the configuration manager 62 executes configuration management such as settings of the element group including the NFs in accordance with the configuration management instruction received from the slice manager 82.

In this embodiment, the SDN controller 60 creates, for example, a communication route between the NFs linked in the creation instruction in accordance with the communication route creation instruction received from the slice manager 82. Further, the SDN controller 60 changes the upper limit of the bandwidth of the communication route between the NFs or recreates the communication route between the NFs in accordance with the change instruction received from the slice manager 82.

In this case, the SDN controller 60 may use segment routing technology (for example, segment routing IPv6 (SRv6)) to construct an NSI and NSSI for the server or an aggregation router present between communication routes. The SDN controller 60 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The monitor 58 acquires monitoring information indicating the network status. The monitor 58 may acquire monitoring information indicating the status of each network slice. The monitoring information is, for example, metric data and an alert notification. The monitor 58 may acquire monitoring information for various levels, such as an NS level, an NF level, a CNFC level, and a hardware level of a server or the like.

The monitor 58 may acquire monitoring information from a module which outputs metric data, for example. The module which outputs the metric data may be set to be hardware such as a server or a software element included in the communication system 1. Further, an NF may be configured to output metric data indicating a metric that is measurable (identifiable) by the NF to the monitor 58. Moreover, a server may be configured to output metric data indicating a metric relating to hardware that is measurable (identifiable) by the server to the monitor 58.

Further, for example, the monitor 58 may acquire metric data from the sidecar container deployed on the server. The sidecar container aggregates metric data indicating metrics output from a plurality of containers in CNFC (microservice) units. This sidecar container may include an agent called "exporter." The monitor 58 may repeatedly execute a process for acquiring the metric data summed up in units of microservices from the sidecar container, at predetermined monitoring intervals through use of a mechanism of a monitoring tool, for example, Prometheus capable of monitoring the container management tool such as Kubernetes.

The monitor 58 may acquire, as metric data, a performance index value indicating a network performance and a time at which the performance index value is acquired. The monitor 58 may acquire, for example, metric data indicating a performance index value for a performance index described in "TS 28.552, Management and orchestration; 5G performance measurements" or "TS 28.554, Management and orchestration; 5G end to end Key Performance Indicators (KPI)" as monitoring information.

When the monitor 58 acquires the above-mentioned monitoring information, for example, the monitor 58 may output the monitoring information to the AI/big data handler 56. The AI/big data handler 56 stores the output monitoring information in the big data storage 70.

Further, the elements such as the network slices, NSes, NFs, and CNFCs included in the communication system 1 and the hardware such as the servers transmit various alert notifications to the monitor 58 (for example, transmit an alert notification triggered by the occurrence of some kind of trouble that has occurred in the hardware or the software).

Further, for example, when the monitor 58 acquires the above-mentioned alert notification as monitoring information, the monitor 58 outputs the notification to the AI/big data handler 56. The AI/big data handler 56 stores the monitoring information in the big data storage 70. The stored alert notification is utilized by the policy manager 80. The process of the policy manager 80 is described later.

The performance calculator 57 calculates, based on a plurality of pieces of metric data stored in the big data storage 70, a performance index value (for example, a type of KPI) based on the metrics indicated by the plurality of pieces of metric data. The performance calculator 57 may calculate a performance index value (for example, a performance index value relating to an end-to-end network slice) that is a comprehensive evaluation of a plurality of types of metrics, which cannot be calculated from a single piece of metric data. The performance calculator 57 may output the performance index data indicating the calculated performance index value to the AI/big data handler 56, and store the performance index value data in the big data storage 70. The performance index data is also a type of monitoring information indicating a status of a network slice.

The performance calculator 57 may directly acquire the metric data from the monitor 58 and calculate the performance index value based on the acquired metric data.

The AI/big data handler 56 accumulates monitoring information such as metric data, alert notifications, and performance index values, and infers the cause of the trouble that has occurred in the network based on the accumulated monitoring information.

The big data storage 70 included in the AI/big data handler 56 stores the monitoring information including metric data and alerts acquired from hardware such as the servers and software elements such as the NFs in association with the corresponding network slices and times. Past monitoring information is accumulated in the big data storage 70.

The normal status determinator 72 included in the AI/big data handler 56 includes a plurality of normal status determination models 73 corresponding to the plurality of network slices respectively. The normal status determinator 72 determines whether or not the status of a target network slice is normal by acquiring the output obtained when input data including an index acquired from the target network slice is input to the normal status determination model 73 corresponding to the target network slice. The plurality of normal status determination models 73 may have a one-to-one correspondence with the plurality of network slices.

The normal status determination model 73 is trained based on normal status training data including the index of a metric acquired at a certain time during a normal-status period or in a fixed period close to the certain time of the corresponding network slice and information indicating the time period in which the index is acquired. The normal-status period is a period in which a failure is not occurring. The index during a normal-status period may include at least a part of data indicating a traffic amount of a predetermined period, an index indicating the network performance of a predetermined period, a representative time of a predetermined period, a day of the week of a predetermined period, and a holiday flag indicating whether or not the predetermined period is a holiday. The normal status determination model 73 may be a trouble detection model based on a publicly known unsupervised machine learning model capable of detecting outliers from data, such as k-nearest neighbors, density-based clustering, and isolation forest.

The input data including the index of the current or the latest fixed time of a certain network slice and the information indicating the current time period is input to the normal status determination model 73. The input data may be data selected from the data stored in the big data storage 70 in accordance with the network slice and the time. The normal status determination model 73 outputs information indicating an inference result indicating whether or not the network status is normal. The normal status determination model 73 may output, for example, information indicating normality for input data having a small difference from any of the training data, and information indicating trouble for input data having a large difference from any of the training data.

The cause estimator 74 included in the AI/big data handler 56 includes a plurality of cause inference models 75 corresponding to the plurality of groups respectively. The plurality of network slices are grouped into a plurality of groups. Further, the cause estimator 74 may include a plurality of cause inference models 75 corresponding to a plurality of cause types respectively. The cause inference model 75 is a machine learning model. The cause types may be, for example, the type of an event which triggers the discovery of the trouble (hereinafter simply referred to as "trigger type"). The cause inference model 75 is trained based on training data including input data including past monitoring information obtained when a trouble occurred in the network and ground truth data indicating the cause of the trouble.

Further, each cause inference model 75 is associated with a cause type, and the cause inference model 75 infers the cause of the trouble from among the plurality of causes included in the associated cause types. The cause inference model 75 may be arranged for each combination of a group and a cause type, and each cause inference model 75 may be trained by using different training data. In order to infer from the plurality of cause inference models 75 that the cause is the cause corresponding to the cause type, there are a plurality of different model determination conditions corresponding to the plurality of cause types respectively. The cause inference model 75 to be used is determined based on those model determination conditions. The conditions can also be said to be conditions for selecting the model to be used from among the plurality of cause inference models 75, and hence the model determination conditions can also be referred to as "model selection conditions".

An instance of the cause inference model 75 may be arranged for each combination of a network instance and a cause type. In this case, the instances of the cause inference model 75 for a certain cause type and for a plurality of network slices belonging to the same group are of the same type trained based on the same training data. It is not required that the cause inference models 75 be divided in accordance with the cause type, and the cause inference models 75 may have an internal parameter common to all network slices.

The cause inference model 75 may be a model which infers the cause of a trouble that has occurred in the network from time series information, like in the case of the Transformer model, for example. The input data to be input to the cause inference model 75 may be a representative index in a snapshot of each of the latest three blocks (for example, three hours in the case of one-hour intervals). The representative index may include at least one item from among traffic, KPI trend, representative time, day of the week, and holiday flag included in the monitoring information. The learning dataset may contain the data of the representative index in a snapshot of each of three consecutive blocks. The plurality of indices included in the learning input data of the cause inference model 75 may be acquired from a log of the monitoring information stored in the big data storage 70 for the network slice belonging to the corresponding group.

For a certain cause type, the normal status determination model 73 and the cause inference model 75 may be used in combination. Further, for a certain cause type, information combining the outputs of a plurality of cause inference models 75 may be used for the cause inference.

The API 76 included in the AI/big data handler 56 provides an API called from the policy manager 80. The API 76 acquires the inference result obtained by the cause estimator 74 (output of cause estimator 74) of the cause of the trouble that has occurred in the network in accordance with the API called from the policy manager 80, and also returns the output of the cause inference model 75 of the cause estimator 74 to the caller.

The API 76 may provide different APIs depending on the cause type (trigger type), or may provide different APIs depending on the network slice. The API 76 may also simply acquire the cause type and network slice as parameters used when the API is called, and return the output of the cause inference model 75 corresponding to those parameters.

In this embodiment, the policy manager 80 executes a predetermined determination process based on, for example, at least one of the above-mentioned metric data, the above-mentioned alert notifications, the above-mentioned output of the cause inference model 75, and the above-mentioned performance index value data.

The policy manager 80 executes an action corresponding to the result of the determination process. For example, the policy manager 80 transmits to the slice manager 82 an instruction to strengthen at least one of the communication route in the network slice and the NF in the core network system 34, for example. Further, for example, the policy manager 80 transmits the details of the trouble that has occurred (for example, the detected event and inferred cause of the trouble) to the ticket manager 54. Moreover, for example, the policy manager 80 outputs to a life cycle manager (not shown) an instruction to scale or replace an element in accordance with the result of the determination process.

In this embodiment, the ticket manager 54 generates, for example, a ticket indicating information to be notified to an administrator of the communication system 1. The ticket manager 54 may generate a ticket indicating details of a trouble (failure) that has occurred. The ticket manager 54 may also generate a ticket indicating a value of the performance index value data or the metric data. The ticket manager 54 may also generate a ticket indicating a determination result obtained by the policy manager 80.

Then, the ticket manager 54 notifies the administrator of the communication system 1 of the generated ticket. The ticket manager 54 may send, for example, an email to which the generated ticket is attached to an email address of the administrator of the communication system 1.

In the following, the process in the communication system 1 for inferring the cause of the trouble that has occurred in the network and the response process corresponding to the cause are described in detail. The inference process and the response process are implemented by the policy manager 80 and the AI/big data handler 56.

In this embodiment, the cause inference model 75 used to infer the cause is determined in accordance with the cause type (trigger type) and the group to which the target network slice belongs. A plurality of model determination conditions are the conditions for determining the cause inference model 75, and correspond to the cause types.

Figure 7:
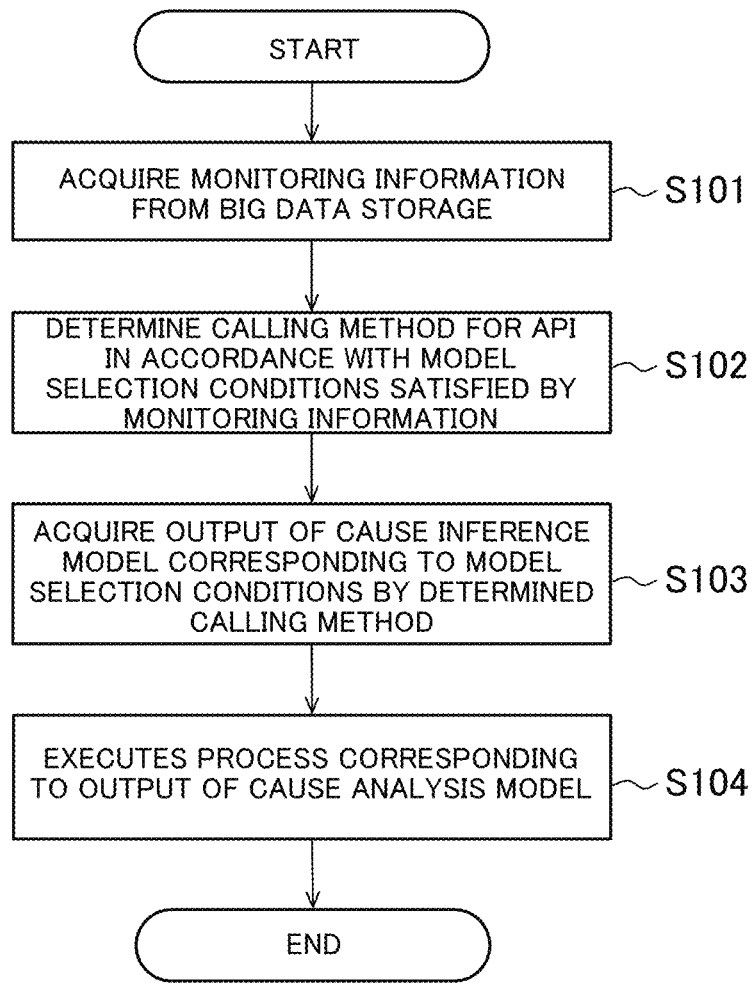
FIG. 7 is a flow chart for illustrating an outline of a process executed by a policy manager.

FIG. 7 is a flow chart for illustrating an outline of a process executed by the policy manager 80. The process flow illustrated in FIG. 7 shows an outline of a process relating to the function of acquiring the cause of a trouble that has occurred in the network and responding to the cause among the functions of the policy manager 80.

First, the policy manager 80 acquires the monitoring information from the big data storage 70 (Step S101). Then, the policy manager 80 determines the calling method for the API 76 in accordance with the model determination conditions satisfied by the acquired monitoring information (Step S102). Then, the policy manager 80 acquires the output of the cause inference model 75 corresponding to the model determination conditions via the API 76 by the determined calling method (Step S103). Input data including the monitoring information acquired from the big data storage 70 may be input to the cause inference model 75. In Step S102, the policy manager 80 may determine whether or not the model determination conditions are satisfied by using a part of the monitoring information. The monitoring information input to the cause inference model 75 may include items different from the monitoring information used in Step S102.

The plurality of model determination conditions includes a first model determination condition and a second model determination condition. The first model determination condition is a condition indicating a trouble relating to the traffic in the network slice (trouble in the performance index such as throughput). The second model determination condition is a condition indicating a trouble relating to registration of the terminal. The details of the processes relating to the first model determination condition and the second model determination condition are described later with reference to FIG. 10 and FIG. 12.

Figure 8:
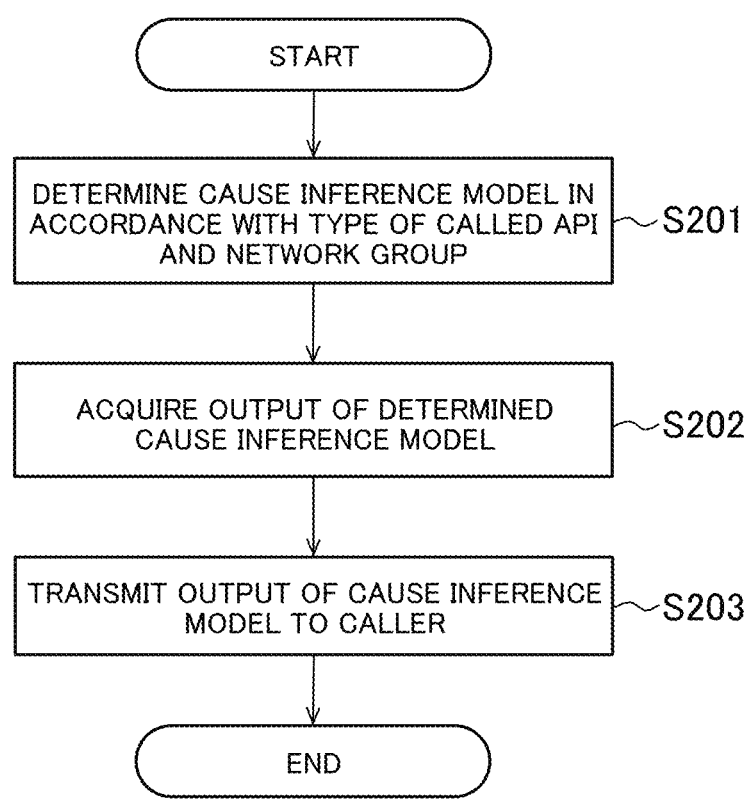
FIG. 8 is a flow chart for illustrating an example of a process executed by an AI/big data handler.

The process executed by the called API 76 is now described. FIG. 8 is a flow chart for illustrating an example of a process executed by the AI/big data handler 56. In FIG. 8, there is illustrated an example of a process executed when an API 76 included in the AI/big data handler 56 is called in Step S103.

The API 76 determines the cause inference model 75 based on the type of the API and the group to which the target network slice belongs (Step S201). Strictly speaking, the API 76 determines the type of the cause inference model 75 based on the group. The API type is an example of an API calling method. In the example of FIG. 8, the API type corresponds to the cause type and the type of an event that triggers the discovery of the trouble. An API may be arranged for each combination of a cause type and a network slice.

In the determination of the cause inference model 75, the API 76 may determine the instance of the cause inference model 75 corresponding to the combination of the type of the called API and the network slice. The type of the cause inference model 75 corresponding to the instance of the cause inference model 75 is determined in accordance with the group, and thus the determination of the instance of the cause inference model 75 corresponding to the network slice is equivalent to the determination of the cause inference model 75 corresponding to the group. In Step S201, the API 76 may determine a combination of two or more cause inference models 75 for which an output is to be acquired.

When the cause inference model 75 to be used has been determined, the API 76 acquires the output obtained when the monitoring information indicating the status of the network for the network slice is input to the determined cause inference model 75 (strictly speaking, the instance of the cause inference model 75) (Step S202). The API 76 may sequentially perform, after the process step of Step S201, acquisition of the input data, input of the monitoring information as the input data to the determined cause inference model 75, and acquisition of the output of the cause inference model 75. The API 76 may acquire the current or latest monitoring information to be input to the determined cause inference model 75 from the big data storage 70 as the input data.

Meanwhile, the monitoring information may be input to any of the plurality of cause inference models 75 as input data regardless of the determination of the cause inference model 75 by the API 76. In this case, the current or latest monitoring information may be periodically input to the cause inference model 75 as input data from the big data storage 70. In this case, the monitoring information may be input to the cause inference model 75 before the determination relating to the model determination conditions by the policy manager or the determination of the cause inference model 75 by the API 76. In this case, the API 76 may acquire the result of the cause inference model already output in Step S202. In a case in which the result for the latest input data has not been output yet, the API 76 may wait until the output of the result. The inference of the cause inference model 75 is started earlier, and thus the trouble can be responded to earlier.

Then, the API 76 transmits the output of the determined cause inference model 75 to the caller (Step S203).

Depending on the determined cause inference model, the determination of the cause inference model and the normal status determination model may be combined. The details of this are described later.

When the policy manager 80 receives the output from the API 76, the policy manager 80 executes a response process corresponding to the output of the cause inference model 75 (Step S104). The trouble that has occurred in the network is resolved or suppressed by the response process. For example, when the output of the cause inference model 75 indicates a first label (in other words, the value of the output matches the value corresponding to the first label, is in a range corresponding to the first label, or the value of the item corresponding to the first label in the output exceeds a threshold value), the policy manager 80 may strengthen the communication route between the CU 44 and the UPF 46, or more specifically, increase the bandwidth of the communication route. When the output of the cause inference model 75 indicates a second label, the communication route may be recreated. When the output of the cause inference model 75 indicates a third label, the number of UPFs 46 involved in data communication may be increased (scaled out), and communication routes between the added UPFs 46 and the existing CUs 44 may be added. Further, for example, when the output of the cause inference model indicates a fourth label, the number of SMFs may be increased (scaled out), when the output of the cause inference model indicates a fifth label, the number of AMFs and SMFs may be increased, and when the output of the cause inference model indicates a sixth label, a restriction may be placed on the connection of UEs. Moreover, as the above-mentioned responding process, the policy manager 80 may transmit a notification of the occurrence of a failure to the ticket manager 54.

The process of FIG. 7 is not required to be actually performed in the order described above. For example, the process steps corresponding to Step S102 to Step S104 may be performed for each model determination condition. For example, a program may be stored in the storage device 30*b* for each model determination condition, the processor 30*a* executing each of programs may determine whether or not the model determination condition included in the program is satisfied (corresponding to Step S102), the API 76 may be called in accordance with the determination result (corresponding to Step S103), and a responding process corresponding to the output of the cause analysis model may be executed (corresponding to Step S104).

Figure 10:
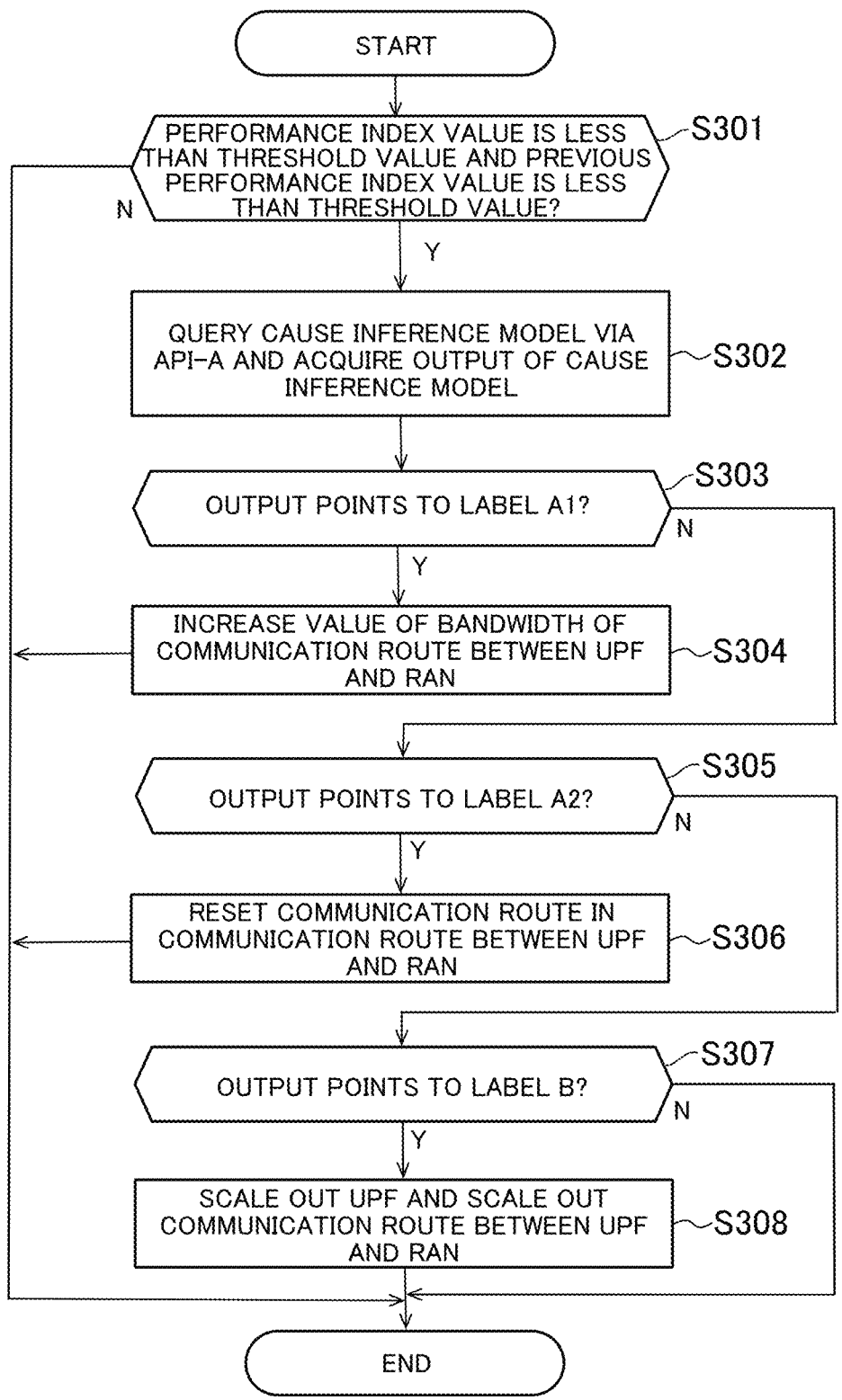
FIG. 10 is a flow chart for illustrating an example of a responding process executed by a policy manager using the cause inference model.

A more detailed description is now given of the process for each model determination condition. FIG. 10 is a flow chart for illustrating an example of a responding process in which the policy manager 80 uses the cause inference model 75. In FIG. 10, the process steps corresponding to Step S102 to Step S104 of FIG. 7 executed when a condition relating to performance is used as the model determination condition are illustrated in more detail. The process illustrated in FIG. 10 is repeatedly executed periodically.

In the process of FIG. 10, first, the policy manager 80 determines whether or not the latest acquired performance index value (for example, throughput) is less than a threshold value and the previously acquired performance index value is less than the threshold value (Step S301).

In Step S301, when the latest performance index value and the previous performance index value are equal to or more than the threshold value ("N" in Step S301), the process of FIG. 10 ends. Meanwhile, when the performance index values are less than the threshold value ("Y" in Step S301), the policy manager 80 queries the cause inference model 75 about the cause via an API-A of the API 76, and acquires the output of the cause inference model 75 (Step S302). The output of the cause inference model 75 points to any of the plurality of labels determined in advance, or indicates that none of the labels are applicable.

It is a kind of the model determination condition that the latest performance index value and the previous performance index value are both less than the threshold value. The reason for this is that the cause inference models 75 called via the API-A are limited, and thus the condition for selecting the API-A is also a condition for selecting the cause inference model 75.

When the acquired output points to a label A1 ("Y" in Step S303), the policy manager 80 transmits to the SDN controller 60 an instruction to increase the bandwidth of the existing communication route between the UPF 46 and the RAN 32 (Step S304), and the SDN controller 60 increases the bandwidth. Further, when the process step of Step S304 is performed, the process illustrated in FIG. 10 ends.

When the acquired output points to a label A2 ("Y" in Step S305), the policy manager 80 transmits to the SDN controller 60 an instruction to recreate the communication route between the UPF 46 and the RAN 32 (Step S306), and the SDN controller 60 recreates the communication route. Further, when the process step of Step S306 is performed, the process illustrated in FIG. 10 ends.

When the acquired output points to a label B ("Y" in Step S307), the policy manager 80 transmits to the configuration manager 62 an instruction to scale out the UPF 46, and transmits to the SDN controller 60 an instruction to scale out the communication route between the UPF 46 and the RAN 32 (Step S308). The instruction to scale out the UPF 46 is an instruction to execute a process for strengthening the processing capacity of the UPF 46, and may be an instruction to add a UPF 46 to the target network slice, for example. Further, the upper limit of the resources of the CNF that can be used by the UPF 46 may be increased. The instruction to scale out the communication route is an instruction to execute a process for strengthening the communication between the added UPF 46 and the RAN 32, and may be an instruction to newly create a virtual communication route to be used for communication between the UPF 46 and the RAN 32, for example. Moreover, the bandwidth of the communication route used for communication between the UPF 46 and the RAN 32 may be increased. The configuration manager 62 that has received the instruction adds the UPF 46, and the SDN controller 60 that has received the instruction newly creates the communication route. Further, when the process step of Step S308 is performed, the process illustrated in FIG. 10 ends.

The process steps of from Step S303 to Step S308 correspond to the response process corresponding to the output of the cause analysis model illustrated in Step S104 of FIG. 7. The response process is not required to be performed, for example, when information indicating that the network status is determined to be normal is returned in the process of FIG. 11 described later.

When the API 76 is called in Step S302, the cause inference model 75 is selected in accordance with the type of the called API and the network slice by the process illustrated in FIG. 8, and the output of the selected cause inference model 75 is returned to the policy manager 80. The AI/big data handler 56 including the API 76 may infer the cause by using the determination result obtained by the normal status determination model 73.

Figure 11:
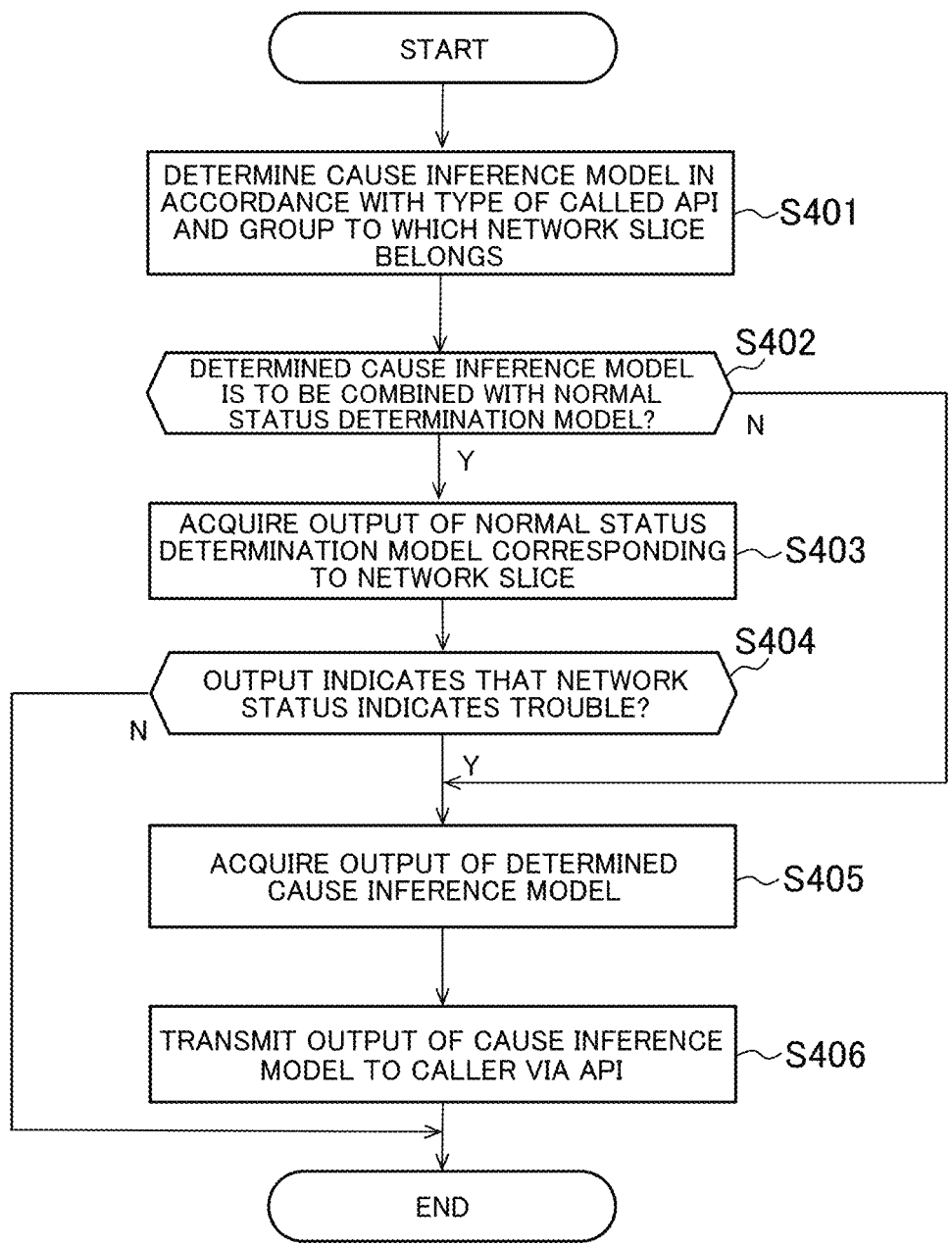
FIG. 11 is a flow chart for illustrating another example of a process executed by the AI/big data handler.

FIG. 11 is a flow chart for illustrating another example of a process of the AI/big data handler 56. The example of FIG. 11 shows a process in which a part of the plurality of types of cause inference models 75 are processed in combination with the normal status determination model 73 corresponding to the network slice. It is assumed that normal status determination information indicating whether or not each of the cause inference models 75 is to be combined with the normal status determination model 73 is stored in advance in the storage device 30b.

First, the API 76 determines the cause inference model 75 in accordance with the type of the called API and the group to which the network slice belongs (Step S401).

Then, the API 76 determines whether or not the determined cause inference model 75 is to be combined with the normal status determination model 73 (Step S402). The determination may be performed based on the normal status determination information stored in association with the cause inference model 75 determined by the API 76. For example, the API 76 may combine the normal status determination model 73 and the cause inference model 75 in the case of a trigger relating to the traffic amount, such as the performance index value of FIG. 10, and may not use the normal status determination model 73 in the case of a trigger not relating to the traffic amount.

When it is determined that the determined cause inference model 75 is to be combined with the normal status determination model ("Y" in Step S402), the API 76 acquires the output of the normal status determination model 73 corresponding to the relevant network slice (Step S403). Further, when the acquired output indicates that the status of the network slice does not indicate trouble ("N" in Step S404), the API 76 transmits information indicating that a trouble has not occurred to the caller, and the process ends. The output of the normal status determination model 73 may be binary information on whether or not the status of the network slice indicates normal or trouble, or may be a value indicating the probability that the status indicates trouble. In the latter case, it may be determined whether the status of the network slice indicates normal or trouble based on whether or not the output of the normal status determination model 73 exceeds a threshold value.

Meanwhile, when the output indicates that the status of the network slice indicates trouble ("Y" in Step S404), the API 76 acquires the output of the determined cause inference model 75 (Step S405). Then, the output of the acquired cause inference model 75 is transmitted to the caller via the API (Step S406). The details of the process steps of Step S405 and Step S406 are the same as the process steps of Step S202 and Step S203 of FIG. 8.

When it is determined in Step S402 that the determined cause inference model 75 is not to be combined with the normal status determination model ("N" in Step S402), the process steps of Step S405 and the subsequent step are executed. The process which is substantially performed in this case is the same as that of FIG. 8.

As illustrated in FIG. 11, when the normal status determination model 73 determines that there is a trouble in the status of the network slice and the output of the cause inference model 75 is transmitted to the caller, the policy manager 80 executes a process for responding to the trouble only when it is determined by the normal status determination model 73 that there is a trouble in the network.

Unlike the examples of FIG. 8 and FIG. 11, different programs may be executed depending on the API. In this case, when an API is arranged for each cause type (or trigger type), the API 76 may determine the type (and instance) of the cause inference model 75 based on the network slice. When an API is arranged for each combination of a cause type (or trigger type) and a network slice, the API 76 may acquire the output of the cause inference model 75 identified by the called API without performing the process steps of Step S201 and Step S401.

Figure 12:
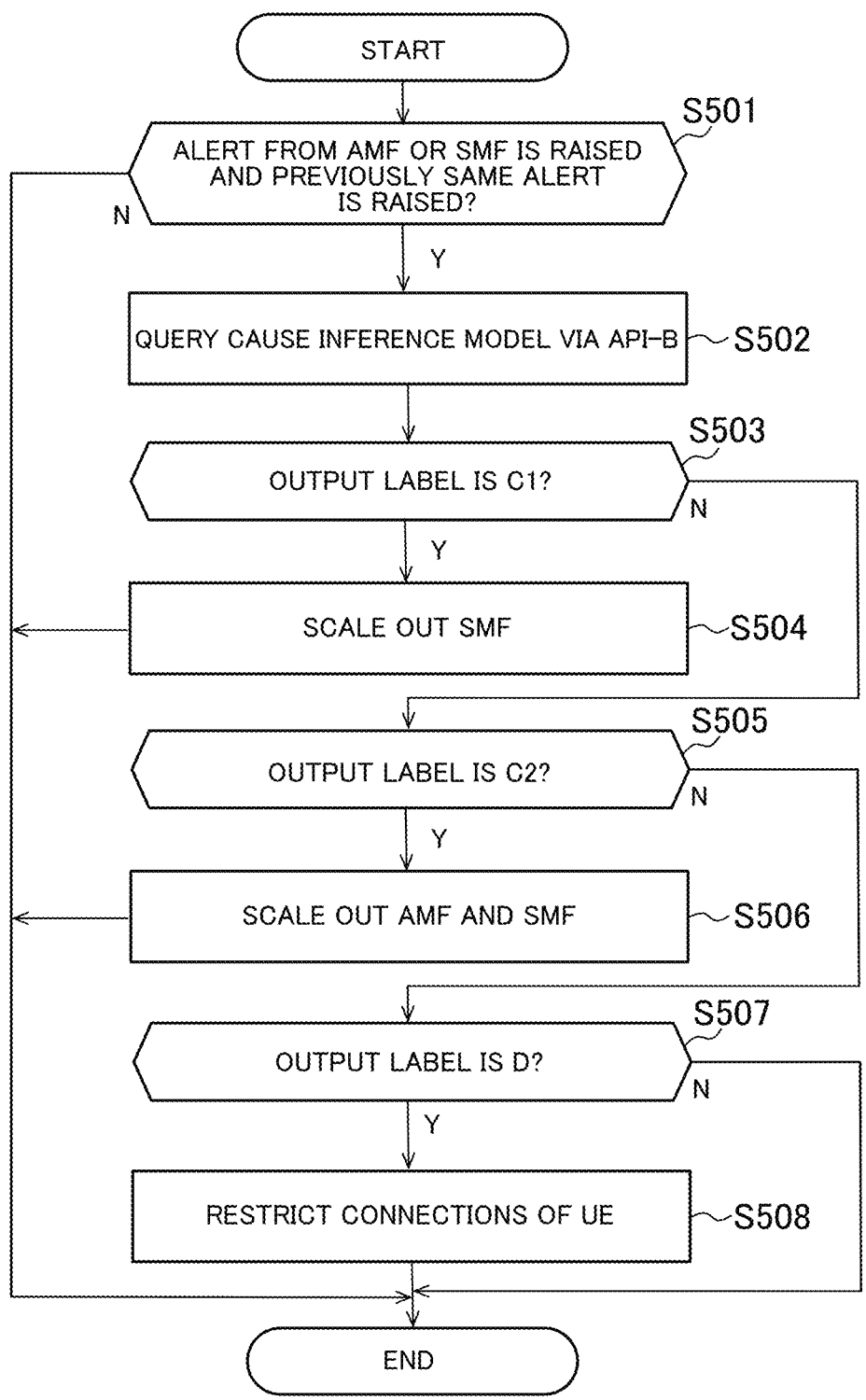
FIG. 12 is a flow chart for illustrating another example of a responding process executed by the policy manager using the cause inference model.

Next, an example of a process of the policy manager 80 for model determination conditions different from those of FIG. 10 is described. FIG. 12 is a flow chart for illustrating another example of a process in which the policy manager 80 responds by using the cause inference model 75. FIG. 12 shows, in more detail, the process steps corresponding to Step S102 to Step S104 of FIG. 7 in the case of an alert raised from a specific NF (specifically, AMF or SMF) as a model determination condition. The process illustrated in FIG. 12 is also repeatedly executed periodically.

In the process of FIG. 12, first, the policy manager 80 determines whether or not the latest monitoring information indicates that an alert from an AMF or SMF is raised, and whether or not the previous monitoring information also indicates that the same alert is raised (Step S501).

When the latest monitoring information and the previous monitoring information do not indicate that the same alert from the AMF or SMF is raised ("N" in Step S501), the process of FIG. 12 ends. Meanwhile, when the latest monitoring information and the previous monitoring information both indicate that the same alert is raised from the AMF or SMF ("Y" in Step S501), the policy manager 80 queries the cause inference model 75 about the cause via an API-B of the API 76, and acquires the output of the cause inference model 75 (Step S502).

It is a kind of the model determination condition that the latest monitoring information and the previous monitoring information both indicate that the same alert is raised from the AMF or SMF. The reason for this is that the API-B and the cause inference models 75 have a correspondence relationship, and thus the condition for selecting the API-B is also a condition for selecting the cause inference model 75.

When the acquired output points to a label C1 ("Y" in Step S503), the policy manager 80 transmits to the configuration manager 62 an instruction to scale out the SMF (Step S504). Further, when the process step of Step S504 is performed, the process illustrated in FIG. 12 ends.

When the acquired output points to a label C2 ("Y" in Step S505), the policy manager 80 transmits to the configuration manager 62 an instruction to scale out the AMF and the SMF (Step S506). Further, when the process step of Step S506 is performed, the process illustrated in FIG. 12 ends.

When the acquired output points to a label D ("Y" in Step S507), the policy manager 80 transmits to the RAN 32 an instruction to restrict connections of the UE 20 (Step S508). The restriction of the UE connections may be performed by a publicly known method. For example, the RAN 32 which has received the instruction may reject connection requests from the UE 20 at a predetermined ratio. As a result, the number of connections of the UE 20 can be reduced over time. The predetermined ratio may be appropriately determined. Further, when the process step of Step S508 is performed, the process illustrated in FIG. 12 ends.

The process steps of from Step S503 to Step S508 correspond to the response process corresponding to the output of the cause inference model 75 illustrated in Step S104 of FIG. 7.

Figure 13:
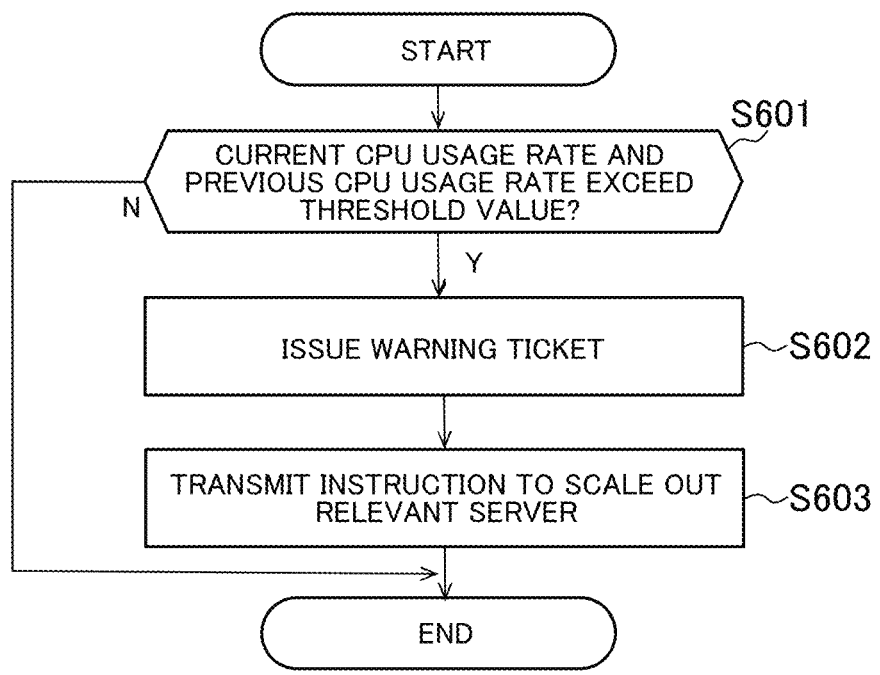
FIG. 13 is a flow chart for illustrating an example of a responding process executed by the policy manager without using the cause inference model.

When the acquired monitoring information satisfies a predetermined response condition, the predetermined response process may be performed without using the output of the cause inference model 75. FIG. 13 is a flow chart for illustrating an example of a response process in which the policy manager 80 does not use the cause inference model 75. The process illustrated in FIG. 13 is used in order to respond to a trouble in which cause inference is relatively easy.

In the process of FIG. 13, first, the policy manager 80 determines whether or not the latest acquired CPU usage rate and the previously acquired CPU usage rate of any of the servers both exceed a threshold value (Step S601). The CPU usage rate of each of the plurality of servers is included in the monitoring information.

When the latest acquired CPU usage rate and the previously acquired CPU usage rate both do not exceed the threshold value for any of the servers ("N" in Step S601), the process of FIG. 13 ends. Meanwhile, when the latest acquired CPU usage rate and the previously acquired CPU usage rate both exceed the threshold value for any of the servers ("Y" in Step S601), the policy manager 80 issues a warning ticket to the ticket manager 54 (Step S602), and the ticket manager 54 outputs to the administrator a message based on the warning ticket. Further, the policy manager 80 transmits to the configuration manager 62 an instruction to scale out the relevant server (Step S603). More specifically, the policy manager 80 transmits to the configuration manager 62 an instruction to divide the functions deployed on the relevant server and arrange the divided functions on this server and other new servers. In this way, when a predetermined response condition, for example, the CPU usage rate, is satisfied, a predetermined response such as issuance of a warning ticket or scaling out the server may be executed.

The process steps of Step S602 and Step S603 are also a type of process corresponding to a process for responding to a network trouble.

In this embodiment, the cause of a trouble that has occurred in a network slice is inferred by using the cause inference model 75, which is a machine learning model. In general, there are few cases in which trouble actually occurs in the network, and hence it is not easy to acquire a large amount of training data regarding the causes of trouble.

In this embodiment, the cause inference model 75 is trained for each group of network slices. Further, a response process is executed in accordance with the output of the cause inference model 75 corresponding to the group to which the network slice belongs. As a result, it is possible to appropriately determine the trouble that has occurred in the network.

More specifically, compared with a case in which a cause inference model 75 is trained for each network slice, training data relating to more troubles can be secured, and the inference accuracy is improved. Further, when the cause inference model 75 is common to all network slices, it is difficult to infer the cause in cases in which the trouble that occurs is different depending on the network configuration. Through use of groups classified in accordance with the network configuration, it is possible to infer the cause corresponding to the network configuration, and the inference accuracy can be improved.

Further, as illustrated in FIG. 10 and FIG. 11, when it is determined by the normal status determination model 73 that there is a trouble in the network, a response process corresponding to the result of the cause inference of the cause inference model 75 is performed.

As described above, it is not easy to acquire a large amount of training data relating to the causes of trouble, but it is easy to secure training data obtained when the status of a network slice is normal. Thus, the inference accuracy of the causes of trouble can be improved by using the normal status determination model 73 to infer in advance in detail whether or not the status of the network slice is normal, and then using the cause inference model 75 to infer the cause of the trouble. Further, by training the normal status determination model 73 for each network slice, the accuracy can be further improved.

Further, in this embodiment, a plurality of cause inference models 75 each corresponding to the trigger in which the trouble is detected are arranged. The cause inference model 75 used to infer the cause is identified in accordance with the model determination condition corresponding to the trigger in which the trouble is detected. This trigger corresponds to the cause type of the trouble. As a result, the range of causes of the trouble that each cause inference model 75 is to infer can be efficiently limited, and the accuracy of cause inference can be improved.

It should be noted that the present disclosure is not limited to the above-mentioned embodiment. The configurations disclosed in the embodiment may be combined in various ways. Further, within the scope of the technical idea of the present disclosure, a part of the configurations described in this embodiment may be modified.

For example, the execution platform in this embodiment may be a Kubernetes cluster. The execution platform in this embodiment may also be a server.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

The embodiment described above has been described assuming actual operation, and thus it is stated in the embodiment that the current network status is determined by using a model trained based on past monitoring information and the current or latest monitoring information. However, the status of the network to be determined is not required to be the current status. That is, the status of the network in a first time period may be determined by using monitoring information obtained in the first time period and a model trained based on the monitoring information obtained in a second time period different from the first time period.

As can be understood from the above description of the embodiment, in the present application, a variety of technical ideas including the disclosure described below are disclosed.

(1) A network system including one or more processors, the network system being configured to cause at least one of the one or more processors to execute: a cause inference process for acquiring an output obtained when input data including an index acquired from a target network of a plurality of networks is input to a cause inference model which is one of a plurality of cause inference models, the plurality of cause inference models being respectively correspond to a plurality of groups into which the plurality of networks have been classified and being trained based on training data including input data including an index acquired for each corresponding group and ground truth data indicating a cause of a trouble, and the input cause inference model being corresponded to one of the plurality of groups to which the target network belongs; and a response process for executing a process for responding to a trouble that has occurred in the target network based on the output of the cause inference model for the target network.

(2) In the network system of Item (1), the plurality of networks are classified into the plurality of groups based on at least a part of information indicating a network configuration, a property relating to a traffic amount, and a network usage.

(3) In the network system of Item (1) or (2), the input data included in the training data used for training the cause inference model corresponding to the one of the plurality of groups including the target network includes an index acquired from a plurality of networks belonging to the one of the plurality of groups including the target network.

(4) In the network system of any one of Items (1) to (3), the output of the cause inference model includes information indicating whether a capacity of a virtualized process constituting the target network is insufficient, and, in the response process, when the output of the cause inference model indicates that the capacity of a predetermined type of virtualized process is insufficient, the number of virtualized processes of the predetermined type is increased.

(5) In the network system of any one of Items (1) to (4), the network system is configured to cause the at least one of the one or more processors to: further execute a normal status determination process for determining whether a status of the target network is normal by acquiring the output obtained when the index acquired from the target network is input to a normal status determination model corresponding to the target network from among a plurality of normal status determination models each corresponding to one of the plurality of networks; execute the cause inference process when it is determined that the status of the target network is not normal; and train the plurality of normal status determination models based on an index of a normal-status period in a corresponding one of the plurality of networks and information indicating a time period in which the index is acquired.

(6) In the network system of Item (5), the index of the normal-status period includes at least a part of data indicating a traffic amount of a predetermined period, an index indicating a network performance of a predetermined period, a representative time of a predetermined period, a day of a week of a predetermined period, and a holiday flag of a predetermined period.

(7) In the network system of any one of Items (1) to (6), the input data included in the training data includes at least a part of a change proportion of an index indicating a network performance, a representative time, a day of a week, and a holiday flag.

(8) A method of responding to a network trouble, the method including causing at least one of one or more processors to: acquire an output obtained when input data including an index acquired from a target network of a plurality of networks is input to a cause inference model which is one of a plurality of cause inference models, the plurality of cause inference models being respectively correspond to the plurality of groups into which a plurality of networks have been classified and being trained based on training data including input data including an index acquired for each corresponding group and ground truth data indicating a cause of a trouble, and the input cause inference model being corresponded to one of the plurality of groups to which the target network belongs; and execute a process for responding to a trouble that has occurred in the target network based on the output of the cause inference model for the target network.

The invention claimed is:

1. A network system, comprising one or more processors, the network system being configured to cause at least one of the one or more processors to execute:
   a cause inference process for acquiring an output obtained when input data including an index acquired from a target network of a plurality of networks is input to a cause inference model which is one of a plurality of cause inference models, the plurality of cause inference models being respectively correspond to a plurality of groups into which the plurality of networks have been classified and being trained based on training data including input data including an index acquired for each corresponding group and ground truth data indicating a cause of a trouble, and the input cause inference model being corresponded to one of the plurality of groups to which the target network belongs; and
   a response process for executing a process for responding to a trouble that has occurred in the target network based on the output of the cause inference model for the target network.

2. The network system according to claim 1, wherein the plurality of networks are classified into the plurality of groups based on at least a part of information indicating a network configuration, a property relating to a traffic amount, and a network usage.

3. The network system according to claim 1, wherein the input data included in the training data used for training the cause inference model corresponding to the one of the plurality of groups including the target network includes an index acquired from a plurality of networks belonging to the one of the plurality of groups including the target network.

4. The network system according to claim 1,
   wherein the output of the cause inference model includes information indicating whether a capacity of a virtualized process constituting the target network is insufficient, and
   wherein, in the response process, when the output of the cause inference model indicates that the capacity of a predetermined type of virtualized process is insufficient, the number of virtualized processes of the predetermined type is increased.

5. The network system according to claim 1, wherein the network system is configured to cause the at least one of the one or more processors to:
   further execute a normal status determination process for determining whether a status of the target network is normal by acquiring the output obtained when the index acquired from the target network is input to a normal status determination model corresponding to the target network from among a plurality of normal status determination models each corresponding to one of the plurality of networks;
   execute the cause inference process when it is determined that the status of the target network is not normal; and
   train the plurality of normal status determination models based on an index of a normal-status period in a corresponding one of the plurality of networks and information indicating a time period in which the index is acquired.

6. The network system according to claim 5, wherein the index of the normal-status period includes at least a part of data indicating a traffic amount of a predetermined period, an index indicating a network performance of a predetermined period, a representative time of a predetermined period, a day of a week of a predetermined period, and a holiday flag of a predetermined period.

7. The network system according to claim 1, wherein the input data included in the training data includes at least a part of a change proportion of an index indicating a network performance, a representative time, a day of a week, and a holiday flag.

8. A method of responding to a network trouble, the method comprising one or more processors and causing at least one of the one or more processors to:
   acquire an output obtained when input data including an index acquired from a target network of a plurality of networks is input to a cause inference model which is one of a plurality of cause inference models, the plurality of cause inference models being respectively correspond to a plurality of groups into which the plurality of networks have been classified and being trained based on training data including input data including an index acquired for each corresponding group and ground truth data indicating a cause of a trouble, and the input cause inference model being corresponded to one of the plurality of groups to which the target network belongs; and
   execute a process for responding to a trouble that has occurred in the target network based on the output of the cause inference model for the target network.

* * * * *